March 3, 1970      R. C. DAYMON      3,498,386
STARTING ROLLER CONTROLS FOR SOD ROLLING MACHINE
Filed June 7, 1967
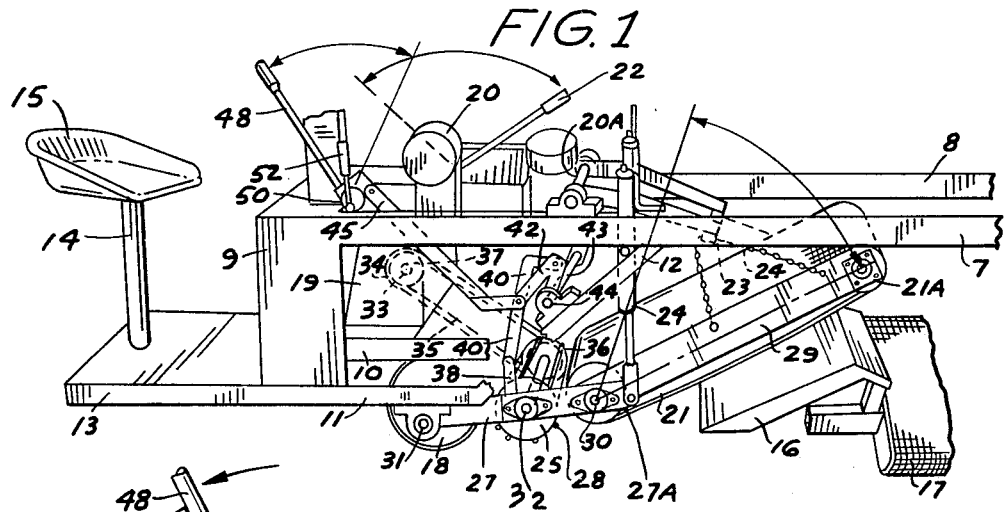
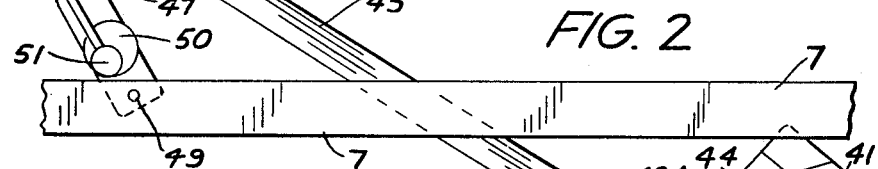
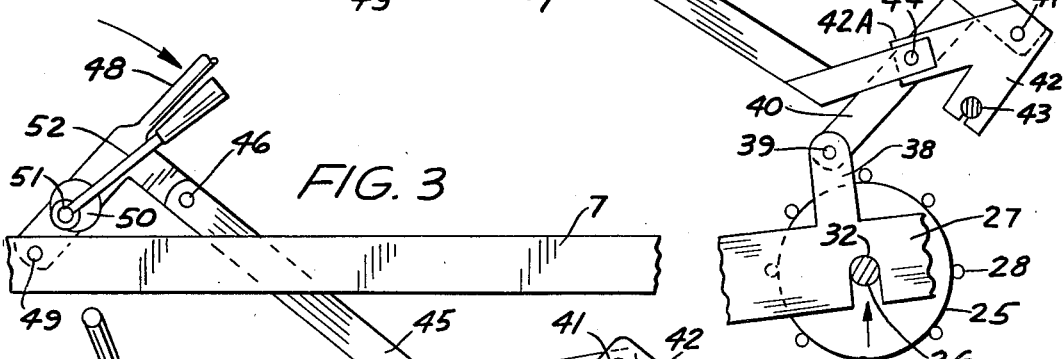
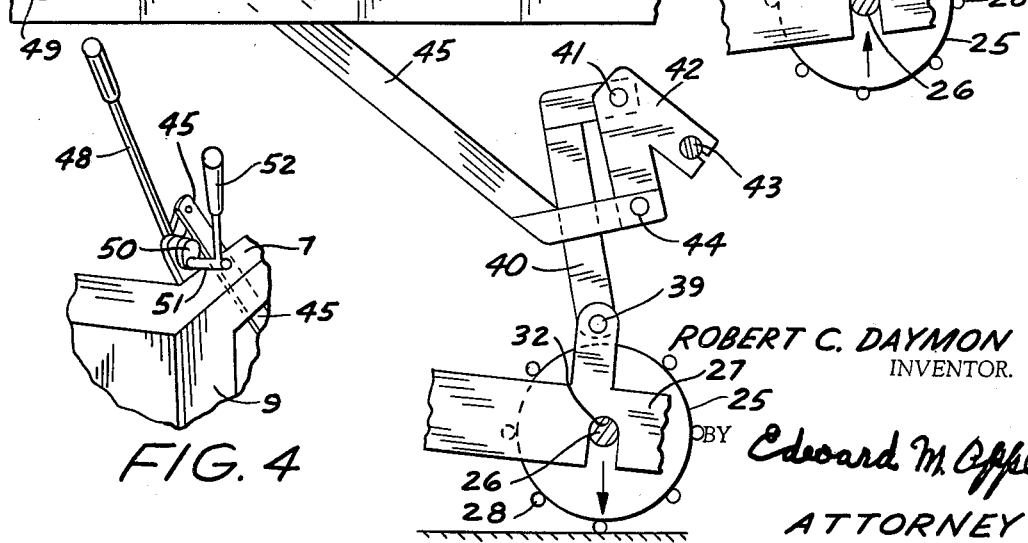
ROBERT C. DAYMON
INVENTOR.
BY Edward M. Apple
ATTORNEY United States Patent Office 3,498,386
Patented Mar. 3, 1970

3,498,386
STARTING ROLLER CONTROLS FOR SOD
ROLLING MACHINE
Robert C. Daymon, 7450 Weller Road,
Gregory, Mich. 48137
Continuation-in-part of application Ser. No. 577,067,
Sept. 2, 1966. This application June 7, 1967, Ser.
No. 644,307
Int. Cl. A01b 45/00, 29/00
U.S. Cl. 172—19                                    6 Claims

ABSTRACT OF THE DISCLOSURE

This application discloses means for adjusting the position of the starting roller of a sod rolling machine. The invention resides in means for making micromatic adjustment of the starting roller of the sod rolling machine so that proper relative positions may be effected between the starting roller and the ground. Other and remote control means are also provided, whereby the starting roller may be quickly lifted out of operating positions.

This invention relates to sod rolling machines of the type disclosed in my co-pending application Ser. No. 577,067, filed Sept. 2, 1966, of which this may be considered a continuation-in-part.

An object of the invention is to generally improve sod rolling machines of the character indicated and to provide means for adjusting the relative position of the starting roller with respect to the main frame of the vehicle and the ground, whereby the machine may be adjusted to compensate for varying operating conditions, such as the thickness and compactness of the sod, the moisture content and the matted condition of the sod and the like.

Another object of the invention is to provide remote control means for quickly elevating the starting roller of the machine out of operating position when it is desired to turn the machine around or transport it from place to place, or to avoid a stone or other debris on the ground which would damage the roller.

Another object of the invention is to provide remote control means for quickly lifting the starting roller, which means include an operating lever near the riding operator support and off center linkage which remains locked in the elevated position until manually unlocked.

Another object of the invention is to provide drive means for the starting roller of a sod rolling machine, which drive means are provided with a sprocket torque limitation arranged so that the starting roller and inclined conveyor drive cannot be damaged if stalled by an immovable object.

The foregoing and other objects and advantages of the invention will become more apparent as the description proceeds, reference being made from time to time to the accompanying drawing, forming part of the within disclosure, in which drawing:

FIG. 1 is a fragmentary side elevational view of a sod rolling machine embodying the invention.

FIG. 2 is an enlarged fragmentary detail, illustrating part of the frame, part of the sub-frame extension, the starting roller, and the lever and linkage for quickly raising and lowering the starting roller. This figure illustrates the relation of parts when the starting roller is in partly elevated position.

FIG. 3 is a view similar to FIG. 2, but showing the position of the parts when the starting roller is in lowered and ground engaging position.

FIG. 4 is an enlarged fragmentary detail of the control lever and the stop cam, and its control lever, as shown in FIGS. 1, 2 and 3.

Referring now more particularly to the drawing it will be understood that in the embodiment herein disclosed the reference characters 7, 8, 9, 10, 11, and 12, indicate in general the principal frame members of the sod rolling machine, which is provided with a rearwardly extending platform 13, on which is mounted a seat post 14, carrying a seat and back rest 15, on which the operator sits while manipulating the sod rolling machine. The sod rolling machine also includes; an inclined ramp 16, a discharge conveyor 17, a propulsion roller 18, a prime mover 19, including a gas tank 20, and an air cleaner 20A, an inclined conveyor 21, a control lever 22, conveyor elevating means 23, 24 and 25. All of the foregoing elements comprise parts of the sod rolling machine and form no part of the within invention, except as they are combined with the elements hereinafter described.

The invention resides in the provision of a starting roller 25, which is a hollow, cylindrical member which rotates on a shaft 26, which is journalled at each end in suitable bearings carried on the sub-frame extension members 27.

The roller is provided with a plurality of longitudinally extending, peripheral ribs 28, which gives the roller improved traction and assists in starting the formation of the sod roll.

The members 27 and 27A comprise extensions of a sub-frame 29, which is pivoted as at 30, for swinging motion, as shown by the arrows (FIG. 1) with reference to the frame members 7 and 8. The sub-frame members 29 support a shaft 30 which carries a plurality of sprockets, which in turn support and drive the inclined conveyor 21. The shaft 30 is driven by the shaft 36 through a chain and sprockets (not shown). The upper end of the conveyor 21 passes over a roller 21A.

The sub-frame extension members 27 and 27A are pivoted, as at 30, 31 (FIG. 1), so that the starting roller 25 may be elevated and lowered as hereinafter described.

The ability to quickly elevate the starting roller 25 is an important feature of the invention, as it permits the operator to elevate the starting roller 25 out of ground contacting position (FIGS. 1 and 2), when it is desired to turn the sod rolling machine around, or when it is desired to transport the machine from place to place, or when it is necessary to avoid an immovable object, such as a stone, or the like, which might damage the power train to the starting roller.

The power train to the starting roller 25 includes a power take off 33, a sprocket 34, drive chain 35, and another sprocket 36 which is keyed to the shaft 32 which supports the roller 25. The power train driving the starting roller 25 also includes a sprocket torque limiting element 37, such as a conventional slip clutch which stops the sprockets 34, 36 and chain 35, in the event that the starting roller 25 hits an immovable object.

In order to control the positioning of the starting roller 25 and to be able to quickly elevate the starting roller 25 out of operating position, I provide the following mechanism, which is clearly illustrated in FIGS. 2, 3 and 4.

It will be seen in FIGS. 2 and 3 that the member 27 is provided with an upstanding element 38 to which is pivoted, as at 39, an L-shaped arm 40, to the short leg of which is pivoted as at 41, a substantially V-shaped member 42, which has its short leg keyed to a shaft 43, which is journalled at either end in bearings 44 (FIG. 1) carried by the structural members 12.

It will be understood that the shaft 43 has keyed to it near each end a member 42, each of which connects through an arm 40 and a member 38, to one of the members 27 at each end of the roller 25, so that the roller is lifted at either end in perfect balance.

Pivoted as at 44 (FIG. 2) to the end 42A of the V- shaped member 42 is another substantially L-shaped member 45 which is pivoted at its upper end, as at 46, to an extension 47 of a control level 48, which in turn is pivoted to the frame member 7, as at 49, for forward and backward motion.

It will be understood that when the lever 48 is moved toward the rear of the sod rolling machine, as shown in FIGS. 1 and 2, the linkage will assume the positions shown in FIG. 2, and the starting roller 25 will then be in elevated position. When the lever 48 is moved forwardly the linkage will assume the position shown in FIG. 3 and the starting roller 25 will be in lowered and ground contacting position.

In order to provide a minute adjustment to the rearward movement of the linkage and therefore to effect different degrees of elevation of the starting roller 25, I provide a cam stop 50 which is eccentrically pivoted as at 51 to the side of the lever 48. The cam 50 is rotated about the pivot 51 by means of a short control lever 52.

When the lever 52 is moved to the right as far as it will go (FIGS. 1 and 4) the periphery of the cam 50 will be moved toward and contact the member 45 and will limit the rearward movement of the member 45 and the lever 48. When the lever 52 is moved to the left as far as it will go the stop cam 50 will be rotated out of limiting position, which will permit the member 45 to travel its full distance rearwardly under the influence of the lever 48.

Thus it will be seen that I have provided manual controls which will permit the operator to quickly lift the starting roller off of the ground and into any desired position within the range of the levers and linkage just described.

It is believed that the operation of the device is obvious from the foregoing description.

Having described my invention, what I claim and desire to secure by Letters Patent is:

1. A sod rolling machine comprising a frame, having front end steering and having a riding operator support at the rear end thereof, a propulsion roller, a prime mover, for driving said roller, an inclined ramp, an inclined belt conveyor mounted for rotation on a sub-frame, which is pivoted to said frame, a starting roller rotatably mounted in an extension of said sub-frame between said propulsion roller and the lower end of said inclined belt conveyor, linkage connected to said sub-frame extension and to a control lever positioned near said operator support for raising and lowering said sub-frame extension and said starting roller, and a second lever pivoted to said control lever, a cam eccentrically mounted on said second lever and movable with said second lever to and away from said linkage for limiting the movement of said first lever and said linkage.

2. The structure of claim 1, including a cam mounted for rotation on said frame near said operator support, means to rotate said cam, the periphery of said cam being contactable by an element of said linkage to limit the movement in one direction of said lever and said linkage.

3. The structure of claim 1, in which the extension of said sub-frame is pivoted to the axis of said propulsion roller and to the axis of a roller supporting one end of said inclined conveyor and said starting roller is pivoted to said sub-frame extension between said other two pivot points.

4. The structure of claim 1, including a pair of screw jacks pivotally connected near one end to said frame and pivotally connected at the other end to said sub-frame near the lower end of said inclined conveyor.

5. The structure of claim 1, in which said linkage includes a shaft journalled to said frame, arms connected for rotation with said shaft, arms pivoted to said first arms and to said frame, and an elongated member connected to one of said first arms and to said control lever for movement therewith.

6. The structure of claim 5, in which said elongated member is arranged to contact a cam rotatable on said frame to limit the movement in one direction of said member and its connecting linkage.

References Cited

UNITED STATES PATENTS

| | | | |
|---|---|---|---|
| 1,294,675 | 2/1919 | Kiner | 198—165 |
| 2,663,242 | 12/1953 | Lancaster | 172—19 |
| 2,682,824 | 7/1954 | Bowser et al. | 172—19 |
| 2,778,292 | 1/1957 | Kavan | 172—19 |
| 3,053,328 | 9/1962 | Geipel | 172—19 |
| 3,164,211 | 1/1965 | Scott | 172—19 |
| 3,235,011 | 2/1966 | Pasinski et al. | 172—19 |

ROBERT E. BAGWILL, Primary Examiner

ALAN E. KOPECKI, Assistant Examiner